United States Patent
Tanner et al.

(10) Patent No.: US 8,342,920 B2
(45) Date of Patent: Jan. 1, 2013

(54) OUTFLOW VALVE HAVING J-SHAPED BELLMOUTH AND CABIN PRESSURE CONTROL SYSTEM EMPLOYING THE SAME

(75) Inventors: Justin A. Tanner, Queen Creek, AZ (US); William A. Facinelli, Phoenix, AZ (US); Albert Kang, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 1108 days.

(21) Appl. No.: 12/254,645

(22) Filed: Oct. 20, 2008

(65) Prior Publication Data

US 2010/0096503 A1    Apr. 22, 2010

(51) Int. Cl.
*B64D 13/02* (2006.01)
(52) U.S. Cl. ........................ 454/71; 244/1 N; 244/129.5
(58) Field of Classification Search .................... 451/71, 451/75, 76; 137/601.01, 601.05, 601.08, 137/601.11, 601.14, 601.15; 244/1 N, 129.1, 244/129.4, 129.5, 130; 454/71, 75, 76
See application file for complete search history.

(56) References Cited

U.S. PATENT DOCUMENTS

| | | | |
|---|---|---|---|
| 3,387,804 A * | 6/1968 | Rhines | 244/129.5 |
| 3,486,721 A * | 12/1969 | Myczinski | 244/129.5 |
| 3,544,045 A * | 12/1970 | Butscher | 244/129.1 |
| 3,740,006 A * | 6/1973 | Maher | 244/129.5 |
| 4,583,704 A | 4/1986 | Krauss et al. | |
| 5,279,109 A | 1/1994 | Liu et al. | |
| 5,396,760 A | 3/1995 | Hines | |
| 6,050,523 A * | 4/2000 | Kraenzien | 244/130 |
| 6,116,541 A * | 9/2000 | Chuang et al. | 244/1 N |
| 6,273,136 B1 * | 8/2001 | Steinert et al. | 137/601.08 |
| 6,682,413 B1 * | 1/2004 | Hoffman et al. | 454/156 |
| 7,185,853 B2 * | 3/2007 | Kelnhofer et al. | 244/129.5 |
| 7,198,062 B2 * | 4/2007 | Hoffman et al. | 137/601.14 |

* cited by examiner

*Primary Examiner* — Eric Keasel
(74) *Attorney, Agent, or Firm* — Ingrassia Fisher & Lorenz, P.C.

(57) ABSTRACT

An outflow valve is provided for use in conjunction with an actuator. In one embodiment, the outflow valve includes a frame and a first door rotatably coupled to the frame. The outflow valve is configured to be moved by the actuator between an open position and a closed position. The first door includes: (i) a main body having a sealing edge, and (ii) a J-shaped bellmouth fixedly coupled to the main body proximate the sealing edge. The J-shaped bellmouth is configured to condition fluid flow through the outflow valve when the first door is in the open position.

18 Claims, 4 Drawing Sheets

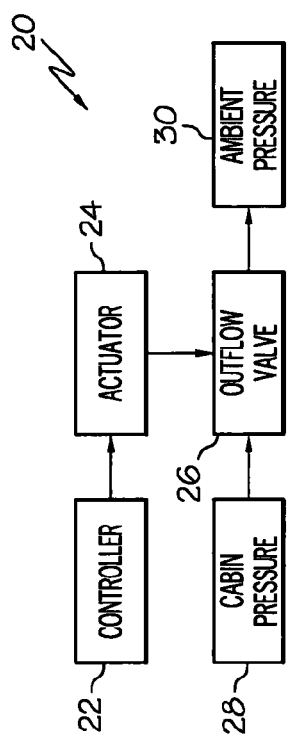
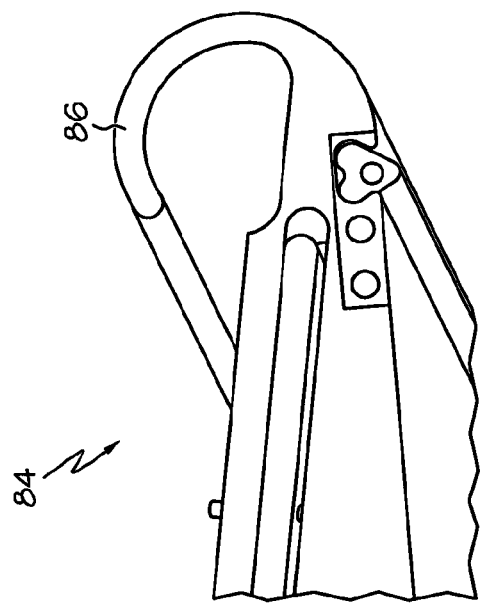
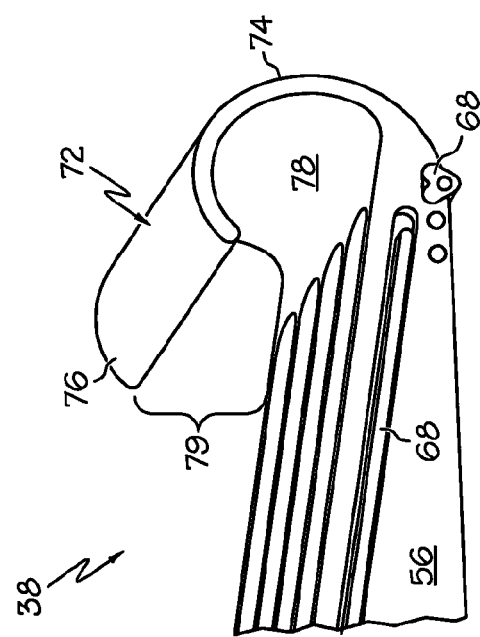
FIG. 1
FIG. 5
FIG. 6

US 8,342,920 B2

OUTFLOW VALVE HAVING J-SHAPED BELLMOUTH AND CABIN PRESSURE CONTROL SYSTEM EMPLOYING THE SAME

TECHNICAL FIELD

The present invention relates generally to aircraft systems and, more particularly, to an outflow valve having a J-shaped bellmouth well-suited for deployment within a cabin pressure control system.

BACKGROUND

Aircraft are commonly equipped with Cabin Pressure Control Systems (CPCSs), which maintain cabin air pressure within a desired range to increase passenger comfort during flight. A representative CPCS may include a controller, an actuator, and an outflow valve. The outflow valve is fluidly coupled between the aircraft's cabin and ambient pressure (referred to herein as "ambient"). During operation, the controller commands the actuator to move the outflow valve between various positions to control the rate at which pressurized air from the aircraft's cabin is vented to ambient. The controller may command the actuator to modulate the outflow valve in accordance with a predetermined schedule or, perhaps, as a function of one or more operational criteria; e.g., as a function of cabin pressure as monitored by a pressure sensor operatively coupled to the controller. By actively modulating the outflow valve in this manner, the controller may maintain the aircraft's cabin pressure within a desired range. Furthermore, the outflow valve may be position such that the pressurized air exhausted thereby provides additional forward thrust to the aircraft.

One known type of outflow valve commonly deployed within cabin pressure control systems is a multi-door outflow valve. The multi-door outflow valve may include, for example, a frame, a first door (e.g., a first rectangular butterfly plate) pivotally mounted to a first portion of the frame, and a second door (e.g., a second rectangular butterfly plate) pivotally mounted to a second portion of the frame. The multi-door outflow valve may be mounted in the aircraft fuselage such that the second door is closer to the aircraft's tail than is the first door; for this reason, the first door and the second door may be referred to herein as the "forward door" and the "aft door," respectively. The forward and aft doors may be mechanically linked by one or more linkages such that the forward and aft doors collectively move between an open position, a closed position, and various intermediate positions. In the open position, the forward and aft doors permit pressurized air to flow from the aircraft's fuselage, and thus from the aircraft's cabin, to ambient. In the closed position, the forward and aft doors each sealingly engage an inner periphery of the frame, and the forward door sealing engages a portion of the aft door, to generally prevent pressurized air airflow from the fuselage to ambient.

Ideally, multi-door outflow valves of the type described above are lightweight, operate in a quiet manner, and provide substantially complete sealing when closed. In addition, when utilized for thrust recovery, it is desirable for such outflow valves to encourage rapid airflow there through to optimize the production of forward thrust in the partially open or cruise position. To this end, certain multi-door outflow valves have been produced that include a cylindrical bellmouth affixed to the inner sealing edge of the forward door (i.e., the edge of the forward door that sealingly engages the aft door in the closed position). When the outflow valve is in the partially open or cruise position, the cylindrical bellmouth conditions the airflow through the outflow valve to produce a relatively smooth laminar flow. The cylindrical bellmouth consequently decreases the production of noise and increases the production of forward thrust in the open position. These advantages notwithstanding, conventional outflow valves including cylindrical bellmouths are limited in certain respects. The provision of the cylindrical bellmouth increases the overall weight of the outflow valve and may add undesirable complexity and cost to manufacturing processes. Additionally, the provision of the cylindrical bellmouth increases the stiffness of the forward door. In so doing, the cylindrical bellmouth hampers the ability of the forward door to flex along with the more-flexible aft door, which, in turn, negatively impacts the sealing characteristics of the outflow valve in the closed position.

Accordingly, it is desirable to provide an outflow valve suitable for deployment within an aircraft's cabin pressure control system that overcomes the above-described limitations. In particular, it would be desirable to provide an outflow valve (e.g., a multi-door outflow valve) that is relatively lightweight, that operates in a quiet manner, that conditions airflow to increase forward thrust production, and that has superior sealing characteristics when closed. Other desirable features and characteristics of the present invention will become apparent from the subsequent detailed description of the invention and the appended claims, taken in conjunction with the accompanying drawings and this background of the invention.

BRIEF SUMMARY

An outflow valve is provided for use in conjunction with an actuator. In one embodiment, the outflow valve includes a frame and a first door rotatably coupled to the frame. The outflow valve is configured to be moved by the actuator between an open position and a closed position. The first door includes: (i) a main body having a sealing edge, and (ii) a J-shaped bellmouth fixedly coupled to the main body proximate the sealing edge. The J-shaped bellmouth is configured to condition fluid flow through the outflow valve when the first door is in the open position.

A cabin pressure control system (CPCS) is further provided for deployment aboard an aircraft including a cabin. In one embodiment, the CPCS includes a controller, an actuator operatively coupled to the controller, and an outflow valve configured to be fluidly coupled between the cabin and an ambient pressure. The outflow valve includes a frame, an aft door rotatably coupled to the frame and mechanically coupled to the actuator, and a forward door rotatably coupled to the frame and mechanically coupled to the actuator. The forward door is configured to move in conjunction with the aft door between an open position and a closed position when driven by the actuator. The forward door includes: (i) a main body having an inner sealing edge configured to sealingly engage the aft door in the closed position, and (ii) a J-shaped bellmouth fixedly coupled to the main body proximate the inner sealing edge. The J-shaped bellmouth is configured to condition pressurized airflow through the outflow valve when in the open position.

BRIEF DESCRIPTION OF THE DRAWINGS

At least one example of the present invention will hereinafter be described in conjunction with the following figures, wherein like numerals denote like elements, and:

FIG. 1 is a generalized block diagram of an exemplary Cabin Pressure Control System (CPCS);

FIG. 5 is a more detailed isometric view of an upstream portion of the aft door, including the J-shaped bellmouth, included within the exemplary outflow valve shown in FIGS. 2-4; and FIG. 6 is an isometric view of an upstream portion of an aft door, including a J-shaped bellmouth, in accordance with a second exemplary embodiment.

DETAILED DESCRIPTION

Figure 2:
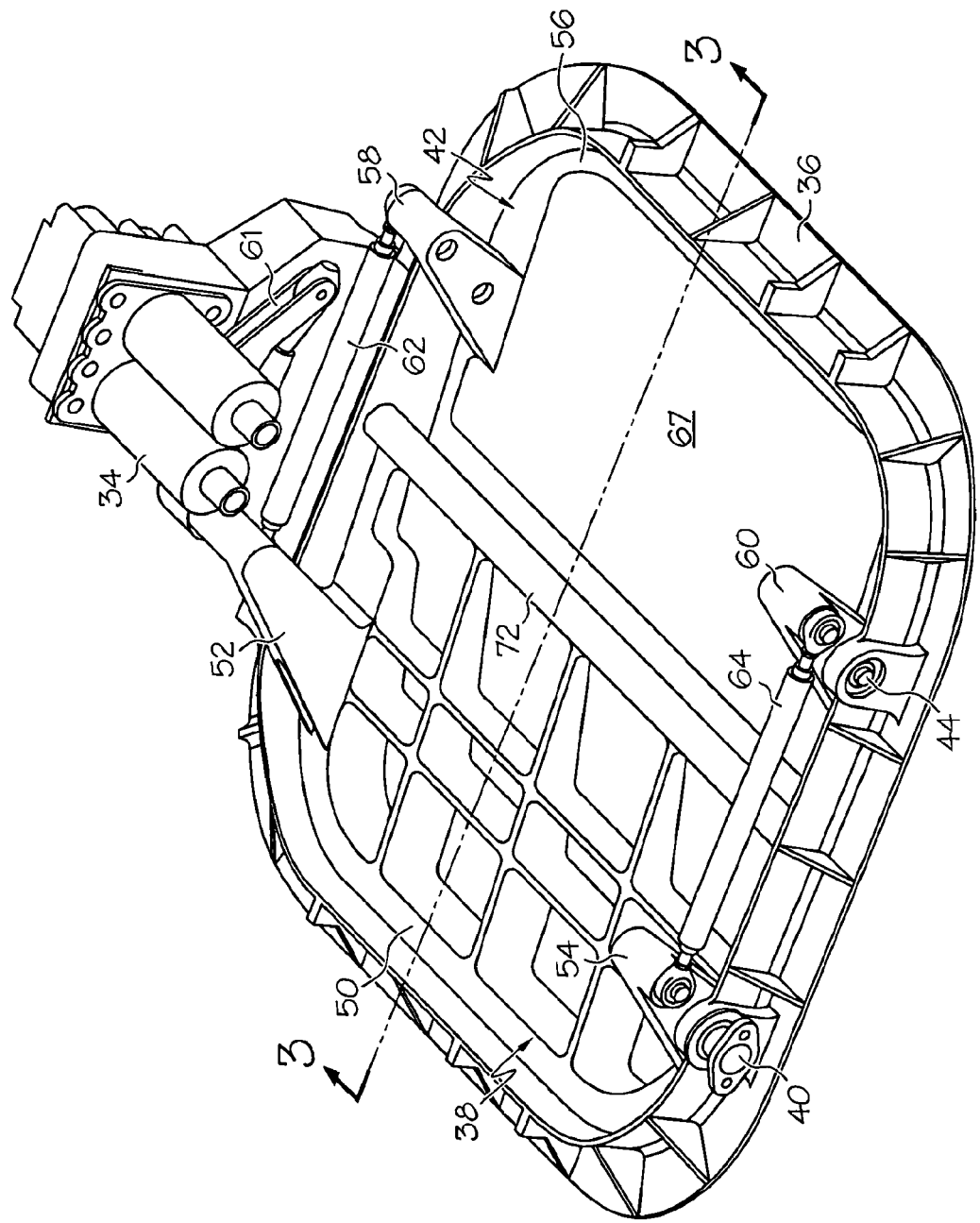
FIG. 2 is an isometric view of an outflow valve suitable for deployment within the CPCS shown in FIG. 1 in accordance with a first exemplary embodiment.

The following Detailed Description is merely exemplary in nature and is not intended to limit the invention or the application and uses of the invention. Furthermore, there is no intention to be bound by any theory presented in the preceding Background or the following Detailed Description.

FIG. 1 is a simplified block diagram of an exemplary Cabin Pressure Control Systems (CPCS) 20 suitable for deployment on an aircraft. In this particular example, CPCS comprises three mains components, namely, a controller 22, an actuator 24, and an outflow valve 26. Outflow valve 26 is fluidly coupled between an aircraft's cabin (represented in FIG. 1 by block 28) and a low pressure source, such as ambient (represented in FIG. 1 by block 30). In one specific implementation, outflow valve 26 is mounted through a wall of the aircraft's fuselage, preferably in the rear underbelly of the aircraft proximate the tail. As will be further discussed below, outflow valve 26 may be positioned so as to provide additional forward thrust to the host aircraft when venting pressurized air from the aircraft's cabin (block 28) to ambient (block 30).

Controller 22 is operatively (e.g., electrically) coupled to actuator 24, which is, in turn, mechanically coupled to outflow valve 26. During operation of CPCS 20, controller 22 commands actuator 24 to move outflow valve 26, and more specifically at least one valve element included within outflow valve 26, between a fully closed position, a fully open position, and various intermediate positions. By actively modulating outflow valve 26 in this manner, controller 22 maintains the aircraft cabin pressure (block 28) within a desired range during flight. Controller 22 may command actuator to modulate outflow valve in accordance with a predetermined schedule or, perhaps, as a function of one or more operational criteria; e.g., as a function of cabin pressure (block 28) as monitored by a non-illustrated pressure sensor operatively coupled to controller 22.

Figure 3:
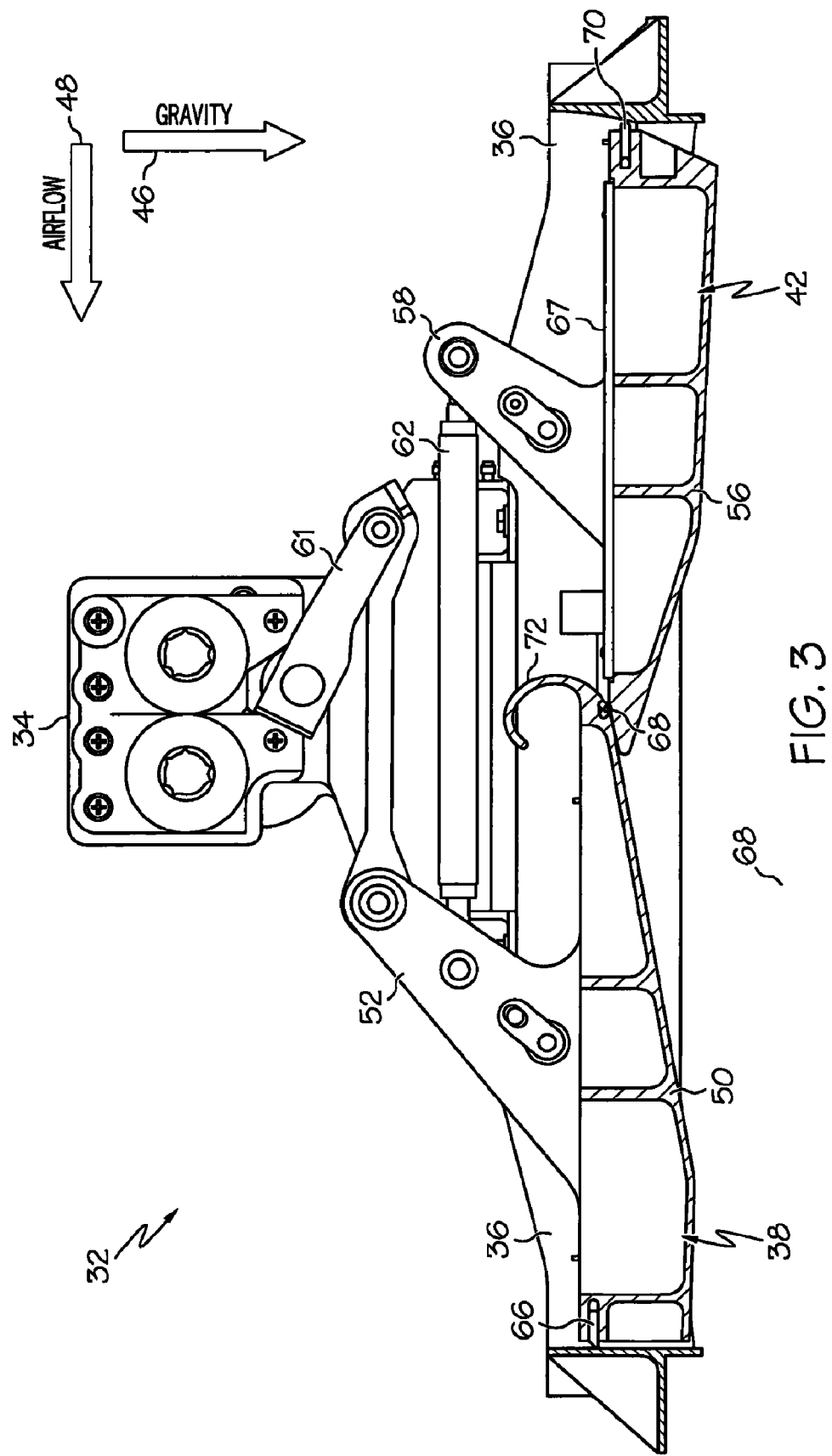
FIGS. 3 and 4 are side cross-sectional views of the exemplary outflow valve shown in FIG. 2 in closed and open positions, respectively, as taken along line 3-3 (labeled in FIG. 2)
Figure 4:
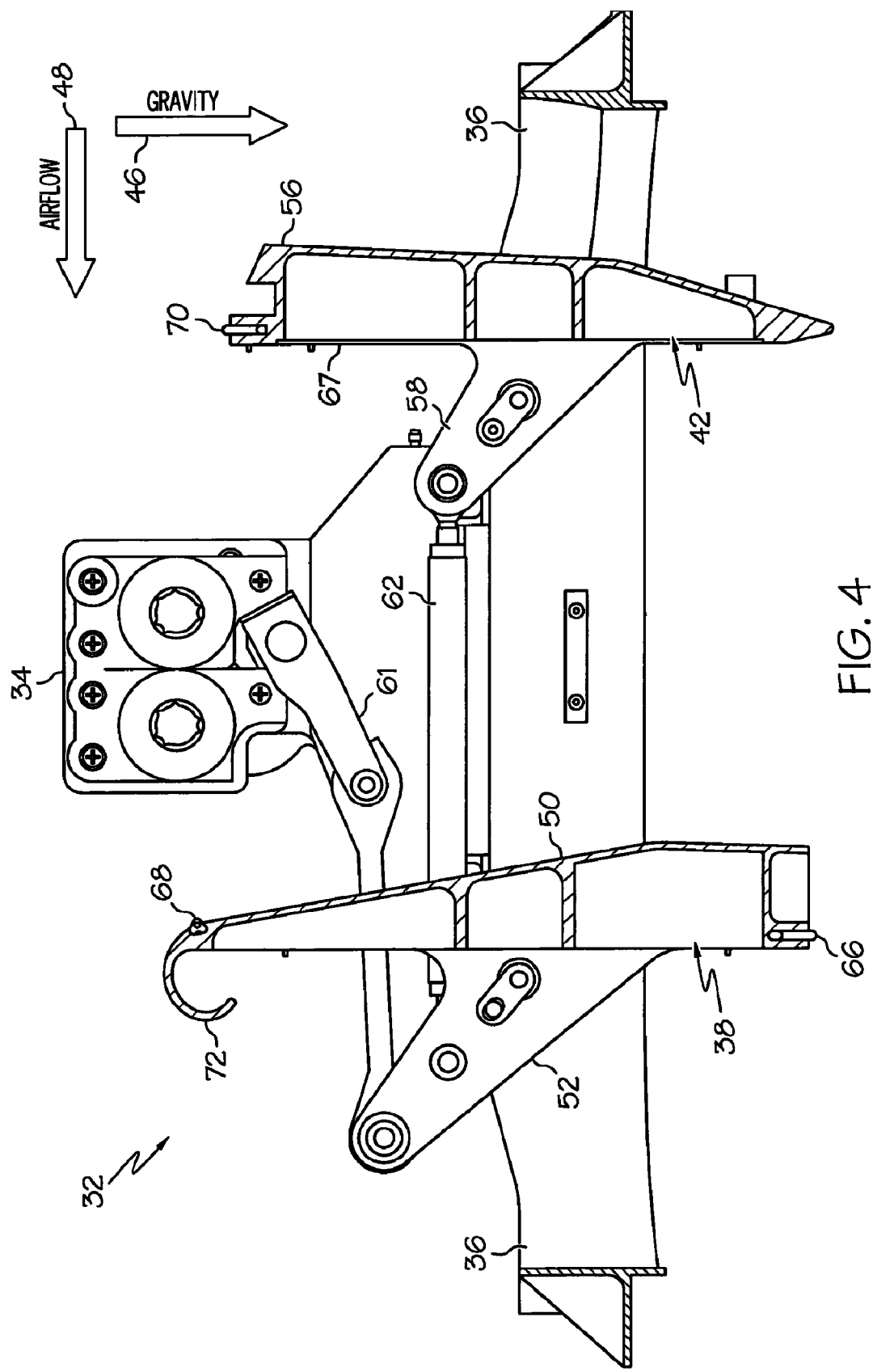

FIG. 2 is an isometric view of an outflow valve 32 and an actuator 34 in accordance with an exemplary embodiment. FIGS. 3 and 4 are side cross-sectional views of outflow valve 32 in fully closed and fully open positions, respectively, as taken along line 3-3 (labeled in FIG. 2). Notably, the position in which outflow valve 32 normally resides during flight ("the cruise position") may be a partially open position intermediate the fully closed position (FIG. 3) and fully open position (FIG. 4). Outflow valve 32 and actuator 34 are suitable for use as outflow valve 26 and actuator 24, respectively, shown in FIG. 1. Outflow valve 32 includes a frame 36, a first door 38 (e.g., a rectangular butterfly plate) rotatably mounted to a first portion of frame 36 (indicated in FIG. 2 at pivot 40), and a second door 42 (e.g., a rectangular butterfly plate) rotatably mounted to a second portion of frame 36 (indicated in FIG. 2 at pivot 44). In the illustrated exemplary embodiment, actuator 34 assumes the form of first and second electrical drive motors, which are each mounted to outer peripheral portion of frame 36. Frame 36 is configured to be affixed (e.g., bolted) to a mounting structure provided on an aircraft. For example, and as previously stated, frame 36 may be mounted through a wall of an aircraft's fuselage. In a preferred embodiment, outflow valve 32 is mounted through the aircraft's underbelly proximate the aircraft's tail as indicated in FIGS. 3 and 4 by gravity arrow 46. Furthermore, outflow valve 32 is preferably mounted such that first door 38 is closed to the aircraft's nose than is second door 40 as indicated in FIGS. 3 and 4 by airflow arrow 48. For this reason, first door 38 and second door 42 will be referred to herein as "forward door 38" and "aft door 42," respectively.

Forward door 38 includes a main, plate-like body 50 and first and second arms 52 and 54, which extend outwardly from body 52 proximate pivot 40. Similarly, aft door 38 includes a main, plate like body 56 and first and second arms 58 and 60, which extend from body 56 proximate pivot 44. Actuator 34 is mechanically coupled to arm 52 of forward door 38 via a master link 61 (e.g., a bell crank type linkage). In addition, arms 52 and 54 of forward door 38 are mechanically linked to arms 58 and 60 of aft door 42, respectively, via first and second slave links 62 and 64; although only a single slave link may be employed in alternative embodiments. Collectively, arms 52, 54, 58 60, and slave links 62 and 64 form a linkage. As a result of this mechanical coupling, forward and aft doors 38 and 42 move substantially simultaneously between closed (FIG. 3) and open positions (FIG. 4) when driven by actuator 34. If desired, aft door 38 may further included a backing plate 67 affixed (e.g., bolted) to main body 56 as shown in FIGS. 2-4.

As shown most clearly in FIGS. 3 and 4, forward door 38 caries two seals: (i) a first wiper seal 66 proximate its outer sealing edge (i.e., the edge of forward door 38 that sealingly engages frame 36 in the closed position), and (ii) a second seal 68 proximate its inner sealing edge (i.e., the edge of forward door 38 that sealingly engages aft door 42 in the closed position). Although not shown in FIGS. 2-4 for clarity, wiper seal 66 may extend around the outer sealing periphery of forward door 38 (i.e., the three sides of forward door 38 adjacent frame 36). By comparison, second seal 68 extends longitudinally along the inner sealing edge of forward door 38. Aft door 42 is likewise equipped with a wiper seal 70, which may extend around the outer sealing periphery of aft door 42 (i.e., the three sides of aft door 42 adjacent frame 36). Seals 66, 68, and 70 may each be partially embedded within (e.g., dovetail with) mating slots provided in forward and aft doors 38 and 42. If desired, seals 66, 68, and 70 may each be energized by a wave spring or other suitable means. Seals 66, 68, and 70 may be formed from various conventionally-known polymeric materials including, for example, extruded silicone or polytetrafluoroethylene (e.g., Teflon®). Seals 66 and 70 may each be single piece or multi-piece seals. Alternative embodiments of outflow valve 32 may not include one or more of seals 66, 68, and 70 depending upon desired sealing characteristics.

When actuator 34 moves outflow valve 32 into the fully open position (FIG. 4) or a partially opened position (not shown), pressurized air flows from the aircraft's cabin, through frame 36 and past forward and aft doors 38 and 42, and to ambient. Outflow valve 32 is preferably designed such that the pressurized airstream flows through frame 36 and past forward and aft doors 38 and 42 is a relatively smooth (non-turbulent), quiet, and rapid manner. Notably, when outflow valve 32 is in the fully open position (FIG. 4) or a partially opened position (not shown), the inner sealing edge of forward door 38 protrudes into the pressurized airstream. Thus, if the inner sealing edge of forward door 38 were to have a thinly-tapered or knife-like profile, as is the case with certain known outflow valves, the inner sealing edge of forward door 38 would create a concentrated disruption in the pressurized airstream encouraging turbulent flow. Therefore, to instead promote laminar flow through frame 36 and past forward and aft doors 38 and 42, forward door 38 further includes a curved bellmouth 72 fixedly coupled to main body 52 proximate the sealing edge of forward door 38. Due to its curved geometry, the upstream face of bellmouth 72 conditions pressurized airflow through outflow valve 32 to promote laminar flow, to decrease the production of noise, and to increase the production of forward thrust. Bellmouth 72 may be designed to provide optimal flow conditioning in its normal cruise position, which may be, for example, a partially open position offset from the fully closed position (FIG. 3) by an angular displacement of approximately 1-5 degrees.

FIG. 5 is an isometric view illustrating the upstream portion of aft door 38 and, more specifically, curved bellmouth 72 in greater detail. Referring collectively to FIGS. 2-5, it can be seen that bellmouth 72 has a generally J-shaped profile and cross-section (as taken through the longitudinal axis of the bellmouth); for this reason, curved bellmouth 72 may also be referred to as "J-shaped bellmouth 72" herein. As labeled in FIG. 5, curved bellmouth 72 includes a downstream portion 76, an upstream portion 74 fixedly coupled between downstream portion 76 and main body 56, and a longitudinal channel 78. Longitudinal channel 78 preferably extends through the entirety of curved bellmouth 72 and may have a generally cylindrical geometry, although this is by no means necessary. Upstream portion 74 and downstream portion 76 each preferably have a generally curved or arcuate geometry. Curved bellmouth 72 further includes a longitudinal window 79, which exposes longitudinal channel 78 through downstream portion 76. In general, curved bellmouth 72 is fixedly coupled to main body 52 of aft door 38 substantially opposite seal 68 and curves inward toward main body 52. In the closed position, the inner sealing edge of forward door 38 generally resides between bellmouth 72 and the inner edge of aft door 42.

In the exemplary embodiment illustrated in FIG. 5, the J-shaped cross-section of curved bellmouth 72 has a generally imperfect (non-circular) elliptical shape. That is, the J-shaped cross-section may generally be defined by a major diameter and a minor diameter (generally corresponding to the vertical and horizontal axes, respectively, in the orientation shown in FIG. 5). This example notwithstanding, the J-shaped cross-section of the curved bellmouth may vary in alternative embodiments. To further emphasize this point, FIG. 6 is an isometric view illustrating an upstream portion of an exemplary aft door 84 including a curved bellmouth 86 in accordance with a secondary exemplary embodiment. As was the case with curved bellmouth 72 (FIGS. 2-5), curved bellmouth 86 has a generally J-shaped cross-section and is fixedly coupled to the main body of a pivotable door 84 proximate the sealing edge thereof. However, in contrast to curved bellmouth 72 (FIGS. 2-5), the J-shaped cross-section of curved bellmouth 86 has a generally circular shape; i.e., the J-shaped cross-section of bellmouth 86 is generally characterized by a uniform diameter.

Referring once again to aft door 38 shown in FIGS. 2-5, and as previously stated, J-shaped bellmouth 72 is fixedly coupled to main body 52 proximate the sealing edge thereof. In one group of embodiments, J-shaped bellmouth 72 may be integrally formed with main body 52; i.e., main body 52 and J-shaped bellmouth 72 may be formed as a unitary piece machined (e.g., milled) from an alloy or metal (e.g., aluminum) blank. Alternatively, J-shaped bellmouth 72 may be formed as a separate piece and then affixed to main body 52 utilizing, for example, a dovetail arrangement and/or a plurality of fasteners (e.g., bolts). In this latter case, main body 52 and J-shaped bellmouth 72 may each be formed from a lightweight alloy or metal (e.g., aluminum); however, it is preferred that main body 52 is formed from a lightweight alloy or metal (e.g., aluminum), while J-shaped bellmouth 72 is formed from a second, different material. The second material is preferably a lightweight, relatively inexpensive, and/or flexible composite or polymer. A non-exhaustive list of suitable materials includes fiber-reinforced polyetherimide (PEI), fiber-reinforced polyetheretherketon (PEEK), and other moldable plastics.

Relative to conventional cylindrical bellmouths, J-shaped bellmouth 72 (FIGS. 2-5) and J-shaped bellmouth 86 (FIG. 6) each have a significantly reduced weight, which is particularly advantageous when outflow valve 32 (or the outflow vale employing J-shaped bellmouth 86) is deployed within a cabin pressure control system (e.g., CPCS 20 shown in FIG. 1) or otherwise deployed aboard an aircraft. Furthermore, relative to conventional cylindrical bellmouths, J-shaped bellmouths 72 and 86 improve the flexibility of forward doors 38 and 84, respectively. Utilizing J-shaped bellmouth 72 (FIGS. 2-5) as a specific example, due to this improved flexibility, main body 52 of forward door 38 may better flex in conjunction with aft door 42 in the closed position (FIGS. 2 and 3) and consequently form a better seal therewith. As a still further advantage, J-shaped bellmouth 72 (FIGS. 2-5) and J-shaped bellmouth 86 (FIG. 6) are relatively straightforward to manufacture in embodiments wherein the bellmouth and the door body are machined as a unitary piece. Again utilizing J-shaped bellmouth 72 as a specific example, and with specific reference to FIG. 5, longitudinal window 79 permits a line of sight into J-shaped bellmouth 72 and thus facilitates the removal (e.g., the milling) of material to form longitudinal channel 78.

While described above in the context of an exemplary cabin pressure control system (i.e., CPCS 20 shown in FIG. 1), it should be appreciated that embodiments of the outflow valve may be utilized in various other avionic and non-avionic applications wherein it is desirable to provide smooth laminar fluid flow through the outflow valve in a partially open position and wherein weight reduction and/or improved sealing characteristics are primary drivers. In such alternative applications, the outflow valve may be utilized to regulate the flow of fluids other than pressurized air. Furthermore, although the above-described exemplary outflow valve employed two (i.e., forward and aft) pivotable doors, alternative embodiments of the outflow valve may include any suitable number of pivotable doors or other such valve elements. In embodiments wherein the outflow valve includes a single door rotatable coupled to the frame, the sealing edge of the door may sealingly engage another component of the outflow valve (e.g., a portion of the frame) in the closed position.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. An outflow valve for use in conjunction with an actuator, the outflow valve comprising:
   a frame; and
   a first door rotatably coupled to the frame and configured to be moved by the actuator between an open position and a closed position, the first door comprising:
      a main body including a sealing edge; and
      a curved bellmouth fixedly coupled to the main body of the first door and extending along a longitudinal axis substantially parallel to the sealing edge, the curved bellmouth having a substantially J-shaped cross-sectional geometry, as taken through the longitudinal axis of the curved bellmouth, the curved bellmouth comprising:
         a downstream end portion curling inward toward the main body and spaced apart therefrom by a longitudinal window; and
         an upstream portion between the sealing edge and the downstream end portion, the upstream portion having a generally arcuate face configured to condition fluid flow through the outflow valve when the first door is in the open position.

2. An outflow valve according to claim 1 wherein the outflow valve further comprises a second door rotatably coupled to the frame, and wherein the sealing edge of the main body is configured to sealingly engage the second door in the closed position.

3. An outflow valve according to claim 2 wherein the sealing edge resides substantially between the curved bellmouth and an outer peripheral portion of the second door in the closed position.

4. An outflow valve according to claim 2 further comprising a seal carried by the first door and configured to sealingly engage the second door in the closed position, the curved bellmouth is fixedly coupled to the main body substantially opposite the seal.

5. An outflow valve according to claim 1 wherein the curved bellmouth further comprises a longitudinal channel there through.

6. An outflow valve according to claim 5 wherein the longitudinal channel has a generally cylindrical geometry.

7. An outflow valve according to claim 5 wherein the longitudinal window exposes the longitudinal channel through the downstream portion.

8. An outflow valve according to claim 1 wherein the curved bellmouth has a generally elliptical cross-sectional geometry.

9. An outflow valve according to claim 1 wherein the main body and the curved bellmouth are formed from first and second materials, respectively.

10. An outflow valve according to claim 9 wherein the first material comprises a metal, and wherein the second material is selected from the group consisting of moldable plastics and composite materials.

11. An outflow valve according to claim 1 wherein the curved bellmouth has a generally J-shaped profile, as viewed from the side of the first door.

12. An outflow valve for use in conjunction with an actuator, the outflow valve comprising:
a frame;
an aft door rotatably coupled to the frame and configured to be mechanically coupled to the actuator; and
a forward door rotatably coupled to the frame and configured to be mechanically coupled to the actuator, the forward door configured to move in conjunction with the aft door between an open position and closed position when driven by the actuator, the forward door comprising:
a main body including an inner sealing edge configured to sealingly engage the aft door in the closed position; and
a curved bellmouth fixedly coupled to the main body proximate the inner sealing edge and having a generally J-shaped cross-section, the curved bellmouth configured to condition fluid flow through the outflow valve when in the open position;
wherein the curved bellmouth extends away from the inner sealing edge and curls back inward toward the main body such that the sealing edge is located between the curved bellmouth and an outer peripheral portion of the aft door when the forward and aft doors are in the closed position.

13. An outflow valve according to claim 12 wherein the curved bellmouth comprises:
a downstream portion; and
an upstream portion fixedly coupled between the inner sealing edge and the downstream portion, the downstream portion and the upstream portion cooperating to substantially define the curved bellmouth.

14. An outflow valve according to claim 12 wherein the curved bellmouth has a generally J-shaped profile, as viewed from the side of the forward door.

15. A cabin pressure control system (CPCS) for deployment aboard an aircraft including a cabin, the CPCS comprising:
a controller;
an actuator operatively coupled to the controller; and
an outflow valve configured to be fluidly coupled between the cabin and an ambient pressure, the outflow valve comprising:
a frame;
an aft door rotatably coupled to the frame and mechanically coupled to the actuator; and
a forward door rotatably coupled to the frame and mechanically coupled to the actuator, the forward door configured to move in conjunction with the aft door between an open position and a closed position when driven by the actuator, the forward door comprising:
a main body including an inner sealing edge configured to sealingly engage the aft door in the closed position;
a bellmouth fixedly coupled to the main body proximate the inner sealing edge, the bellmouth having a curved upstream face configured to condition pressurized airflow through the outflow valve when in the open position; and
a longitudinal channel formed in the bellmouth and extending along an axis substantially parallel to the inner sealing edge.

16. A CPCS according to claim 15 wherein the bellmouth has a generally J-shaped profile, as viewed from the side of the forward door.

17. A CPCS according to claim 16 wherein the bellmouth comprises:
a downstream portion; and
an upstream portion fixedly coupled between the sealing edge and the downstream portion, the downstream portion and the upstream portion each having a generally arcuate geometry.

18. A CPCS according to claim 17 wherein the bellmouth further comprises a longitudinal window, the longitudinal window exposing the longitudinal channel through the downstream portion.

* * * * *